J. A. WHITCOMB AND R. KOEHLER.
REAR AXLE CONSTRUCTION FOR MOTOR VEHICLES.
APPLICATION FILED SEPT. 29, 1919.
1,370,247.  Patented Mar. 1, 1921.
3 SHEETS—SHEET 1.
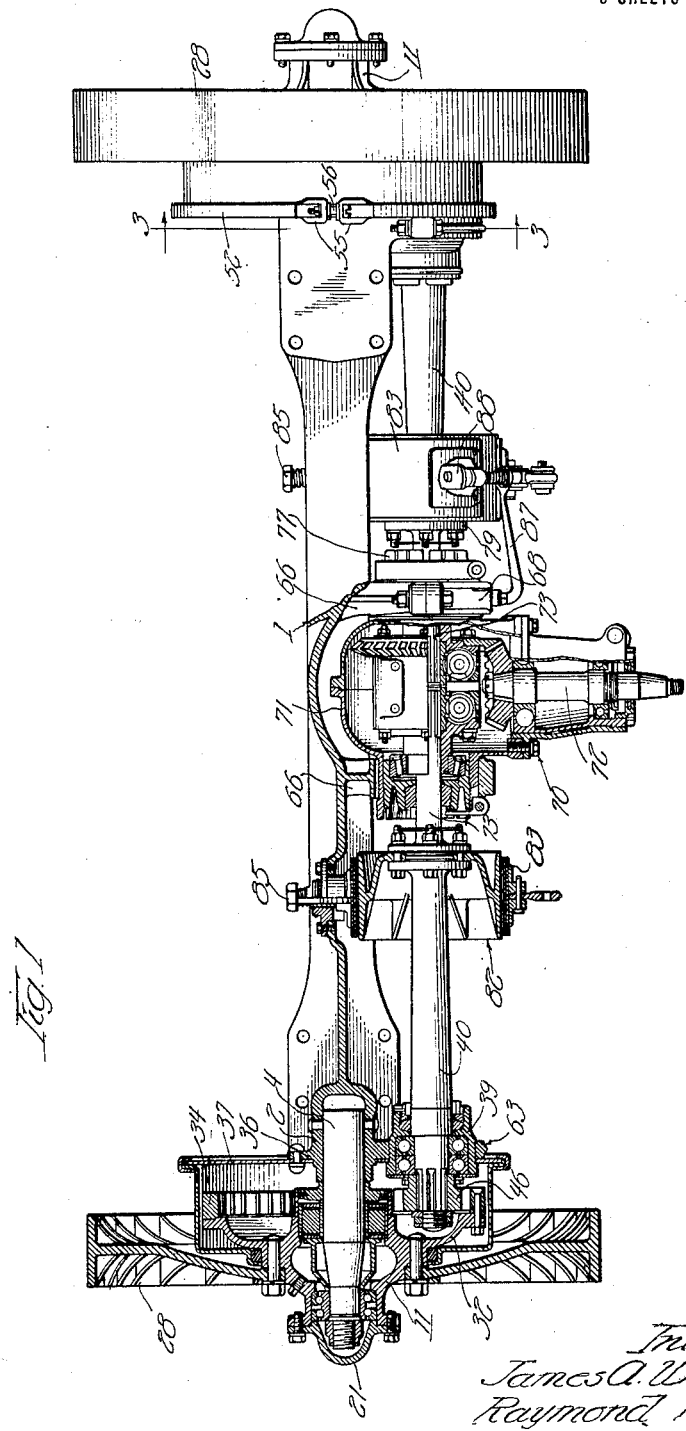

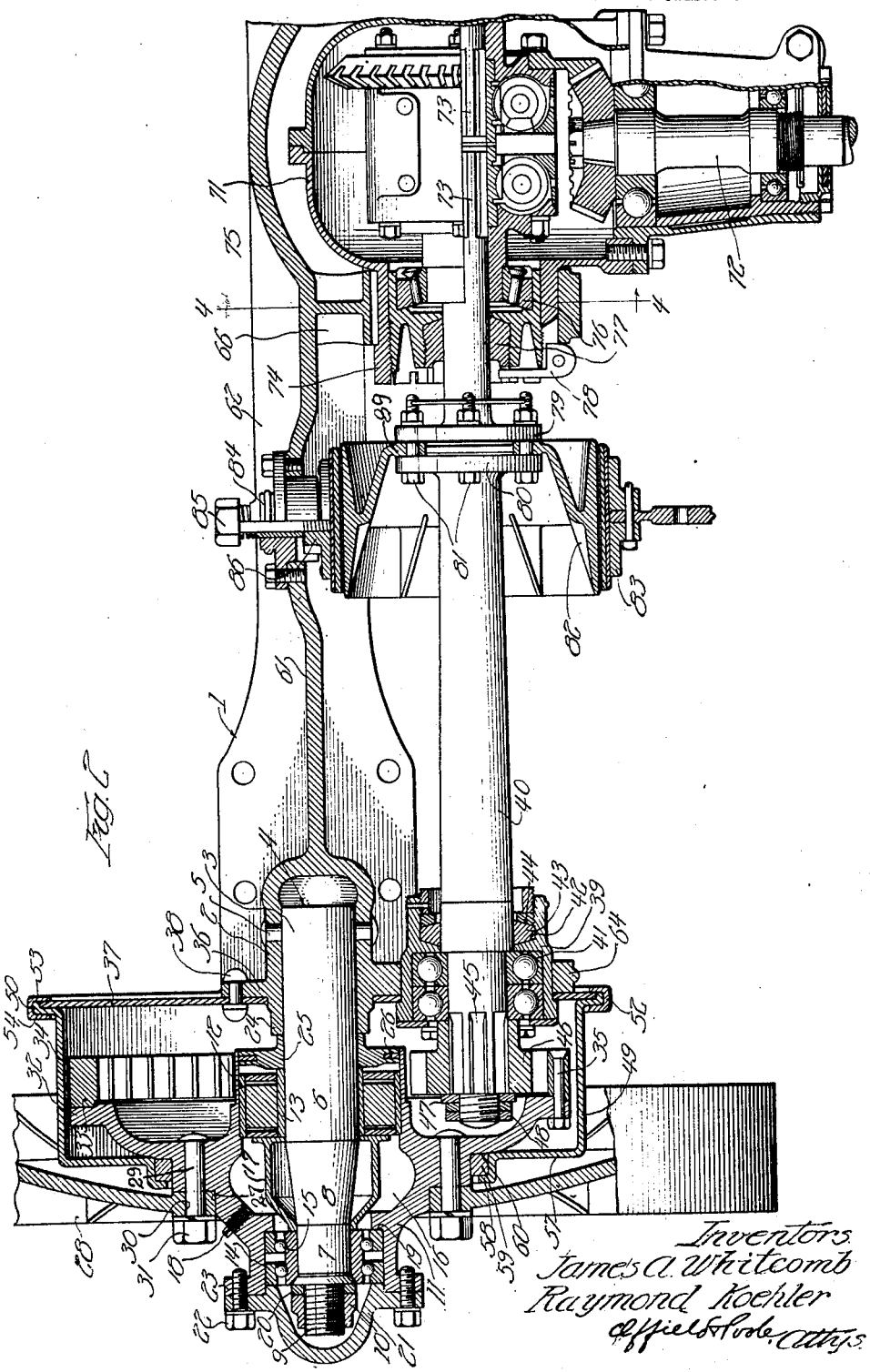

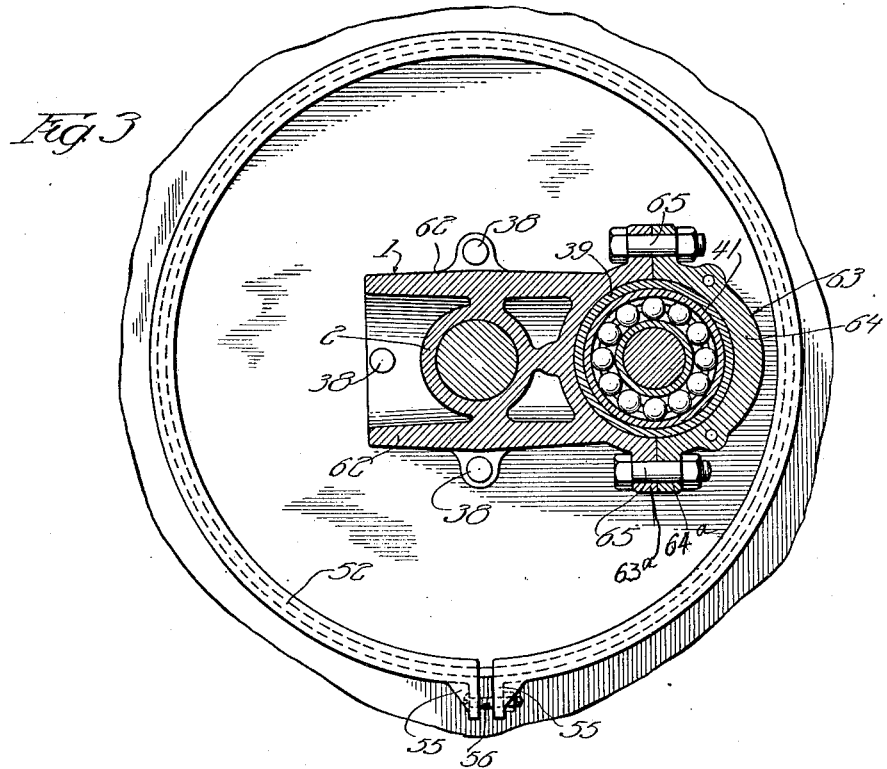

UNITED STATES PATENT OFFICE.

JAMES A. WHITCOMB AND RAYMOND KOEHLER, OF KENOSHA, WISCONSIN, ASSIGNORS TO KENOSHA WHEEL AND AXLE COMPANY, OF KENOSHA, WISCONSIN, A CORPORATION OF WISCONSIN.

REAR-AXLE CONSTRUCTION FOR MOTOR-VEHICLES.

1,370,247. Specification of Letters Patent. Patented Mar. 1, 1921.

Application filed September 29, 1919. Serial No. 327,153.

*To all whom it may concern:*

Be it known that we, JAMES A. WHITCOMB and RAYMOND KOEHLER, both citizens of the United States, and both residents of Kenosha, in the county of Kenosha and State of Wisconsin, have invented certain new and useful Improvements in Rear-Axle Constructions for Motor-Vehicles, of which the following is a specification.

This invention relates to improvements in driving gear and rear axle constructions for motor vehicles and more particularly to structures of the character described designed for use with motor vehicles of the heavy commercial type.

The object of the invention is to provide an improved axle construction involving certain novel features calculated to simplify the methods of manufacture and assembly of the parts comprising the axle and the driving gear carried thereby, these features being fully set forth together with the advantages thereof in the description which follows in connection with the accompanying drawings, wherein—

Figure 1 is a top plan view of a rear axle of a motor vehicle with parts of the axle, a wheel and driving gear showing in section, Fig. 2 is an enlarged view of one half of the axle and driving gear shown in section, Fig. 3 is an enlarged detail view in cross section taken on line 3—3, of Fig. 2, and Fig. 4 is an enlarged detail view in cross section taken on line 4—4 of Fig. 2.

The structure to which the invention relates is illustrated and described in connection with the so-called internal gear type of drive employed in commercial vehicles or trucks, this type ordinarily involving a solid or forged rear axle, the wheels being journaled on fixed spindles and driven by an internal gear mounted on the wheels and meshing with pinions carried by jackshafts which are mounted in suitable bearings, and having driving connection with a differential mechanism, all suspended from or carried by the axle.

Referring to the drawings, the axle or load-carrying member 1, which is preferably of the usual forged I-beam construction, is provided with a socket 2 at each end in which the end 3 of the wheel spindle 4 is inserted and secured by means of the pin 5 or in any other convenient manner. This spindle has an enlarged central portion 6, an outer reduced portion 7, and an intermediate tapered portion 8, and the extreme outer end of the spindle is threaded at 9 so as to have the spindle nut 10 threaded thereon. A hub 11 is inserted on the spindle and is bored out at the inner end at 12 to have the roller bearing 13 fitted therein, which bearing engages the enlarged central portion 6 of the spindle 4, and the outer end of the hub 11 is bored out at 14 to have the duplex ball bearing 15 fitted therein, which bearing engages the reduced end portion 7 of the spindle 4, the two bearings 13 and 15 serving to rotatably support the hub 11 on the spindle. The hub 11 is chambered or enlarged at 16 between the bearings 13 and 15 to afford an oil or grease compartment and has a spacer 17 inserted on the spindle 4 between and separating the bearings 13 and 15, and there is a plug 18 threaded into an aperture leading into the annular chamber 16 so that lubricant may be inserted therein to oil the bearings 13 and 15.

The inner end of the opening 14 at the outer end of the hub is shouldered at 19 and has the outer shell of the bearing 15 engaged thereagainst, and the inner shell of this bearing is held on the spindle 4 by the spindle nut 10 which is threaded on the outer end 9 of the spindle and holds a washer 20 against the inner shell of the bearing, thus serving to lock the hub 11 on the spindle 4. A hub cap 21 is secured by bolts 22 to the annular flange 23 at the outer end of the hub 11 and is arched centrally in the usual manner to cover the outer end of the spindle and spindle nut 10 and close the bearing opening.

The inner end of the bearing opening 12 telescopes over the spindle 4 to a point adjacent the outwardly extending hub portion 24 of the socket 2 and there is a disk 25 telescoped on the spindle 4 and held in place between the hub 24 and the bearing 13 and provided with an annular groove with a ring 26 of packing material which fits into the end of the bearing opening 12 so as to close the latter and separate the bearings 13 and 15 and oil chambers therefor in the hub 11 from the gear compartment hereinafter described.

The hub 11 is adapted to have the driven wheel, as the ground wheel of the truck, detachably secured thereto and for this purpose is provided with an annular rabbet 27 and the wheel 28 with a central opening which fits the rabbet 27 and the wheel is secured to the hub 11 by bolts 29 which are threaded or otherwise fixed to the hub and project through apertures 30 in a wheel flange and have the nuts 31 threaded on the outer ends. At the inner side of the wheel 28 and spaced therefrom the hub has an annular flange 32, the rim of which is formed with an annular seat 33 to receive an internal gear ring 34 and holds the latter concentric with the axis of the hub 11, said gear ring being detachably secured to the flange 32 by a plurality of bolts 35.

The axle 1 at the outer end and around the socket 2 is provided with a flange 36 to which a circular plate 37 is secured by rivets 38 or in any other substantial manner, and at one side of the spindle 4 the flange 36 has a bearing sleeve 39 fixedly secured therein through which the driving shaft 40 extends. In the usual form of rear wheel drive truck the shaft 40 extends inwardly alongside the axle 1 and connects with the usual differential. The construction for mounting the shaft 40, the differential, and associated parts will hereinafter be described more in detail.

The bearing 39 may be of any suitable type which affords a connection with the shaft 40 sufficiently tight to prevent escape of lubricant from the gear case hereinafter described and in the present structure comprises a ball bearing 41 fitted in the bearing sleeve 39, the latter having a packing chamber or gland 42 at the outer side of the bearing 41 containing packing 43 which is pressed around the shaft 40 by a plug 44 or other suitable device secured in the outer end of the sleeve 39.

The inner end of the shaft 40 beyond the bearing 41 projects within the gear ring 34 and is formed with a plurality of keys 45 and has a pinion 46 slipped onto the end of the shaft and fitting the keys 45 so as to rotate with the shaft and retained on the shaft by the nut 47 which is turned onto the threaded inner end 48 of the shaft 40. This pinion 46 meshes with the teeth of the gear ring 34 and when the shaft 40 is rotated operates the gear ring at a reduced speed and rotates the hub and wheel 28 thereon about the spindle 4. For completely inclosing the gearing and rendering the same readily accessible we have provided a gear case or housing consisting of a shell 49 having a large opening at the inner side with an annular flange 50 engaging against and over the rim of the plate 37. The shell 49 is secured to the plate 37 by a clamp 52 which consists of an internally channeled ring with divergent lateral walls 53 and 54. The ring is split, as indicated in Figs. 2 and 3, and the ends provided with lugs 55 through which a bolt 56 is passed for contracting the ring. This ring is fitted over the adjoining flange 50 of the gear case 49 and rim of the plate 37 preferably with the clamping bolt 56 at the top and when this bolt is tightened and the ring 52 contracted, the walls 53 and 54 wedge the flange 50 of the casing 49 against the rim of the plate 37, thus mounting the casing 49 securely on the plate 37 and effecting a tight joint so that the casing will hold lubricant without possibility of leakage.

This casing 49 is of sufficent diameter to fit over the annular flange 32 and gear ring 34 for inclosing the same and at the outer side thereof has an inturned wall 57 with a central opening of suitable diameter to receive the hub 11 therethrough immediately inside the rabbet 27. The wall of this opening is offset therearound at 58 to afford an annular seat for a ring 59 of felt or suitable packing which is held in the angular recess 60 formed at the juncture of the flange 32 with the hub 11, and enables the hub 11 to rotate freely in the opening through the wall 57 of the casing 49 and at the same time provides a joint to exclude dirt and dust from the gearing and prevent escape of lubricant from the gear case 49. Owing to the provision of an opening of reduced size through the wall 57 of the casing 49 an annular chamber is afforded in the casing 49 which at the bottom extends a sufficient distance below the joint 58, 59, 60 to contain a sufficient quantity of lubricant below the level of the joint to satisfactorily lubricate the gearing and avoid permeation of lubricant through the packing 59 which would occur if the level of the oil in the case or housing 49 were thereabove. This also avoids the necessity of the packing 59 being clamped as tightly between the shoulder 58 and hub 11 as would be required if the joint closed by the packing extended below the level of the oil.

Referring more in detail to the structure of the axle 1, and the means for mounting the parts of the driving gear thereon, the said axle, as hereinbefore indicated, is generally of an I-beam section, the central portion of the axle having a vertical web 61 and transverse webs 62, as shown in Fig. 4. At the ends of the axle the central web 61 is considerably reduced in height and merges into the socket 2, as shown in Fig. 3. The transverse webs 62 adjacent the ends of the axle are somewhat increased in thickness and in length as is clearly shown in Fig. 3, these webs terminating at one end in a circular supporting ring or bracket 63, this bracket acting to surround the bearing sleeve 39 extending through an opening in the plate 37 of the gear housing and securely supported within the bracket. As a preferable construction this bracket consists of an integral semi-circular portion and a removable portion 64 of similar shape which is normally fixed to the integral portion by means of bolts 65 which engage lugs 63$^a$ and 64$^a$ formed on said fixed and removable parts of the bracket.

Located intermediate the ends of the axle 1 are provided two integral brackets 66, 66, the same being spaced apart and each comprising circular members or collars preferably formed of two parts of semi-circular shape, one of the parts 67 being removable and connected to the fixed part by means of bolts 68, 68 which extend through lugs 69, 69 integral with the parts of each bracket. Within the integral brackets 66, 66 is supported the differential mechanism 70, the same comprising a housing 71 which completely incloses the mechanism embracing those parts which ordinarily constitute the differential mechanism of a motor vehicle. Inasmuch as the parts of the differential mechanism are well known it is thought unnecessary to describe in detail the function and relation of those parts other than to mention the drive shaft 72 which is a part of the main drive shaft, and the stub shafts 73 which are arranged at right angles to the main drive shaft 72 and are connected thereto through the medium of the gear wheels and other mechanism inclosed within the housing 71. The housing is provided on opposite sides with integral bearing sleeves 74, 74 arranged in concentric relation with the stub shafts 73. These bearing sleeves 74, 74 are surrounded by the brackets 66, 66 and are securely held and supported thereby, there being preferably provided registering keyways cut in the bearing surfaces of the brackets 66 and sleeves 74 in which is placed a key 75 which acts to prevent the angular displacement of the housing relative to the supporting bracket after the parts have been assembled. Within the sleeves 74, 74 of the housing 71 are mounted the anti-friction bearings 76 and retaining collars 77, the latter being locked against rotative movement by means of a locking key 78 carried by the sleeve. The stub shafts 73, 73 extend a short distance beyond the ends of the bearing sleeves 74, 74 of the differential housing 71 and terminate in flanges 79, 79, said flanged ends having substantially abutting engagement with the adjacent ends of the shafts 40, 40, each of said shafts being provided with a similarly flanged end 80. The flanged ends of each stub shaft 73 and its associated shaft 40 are detachably connected together by means of a plurality of bolts 81 extending through the flanges 79 and 80.

Mounted adjacent to the differential mechanism and on opposite sides thereof are the brakes, each comprising a brake drum 82 and a brake band 83, the latter being supported from the axle 1 by means of a bracket 84 having mounted therein a screw 85 which has screw threaded engagement with a boss 86 formed integral with the brake band. Each brake band is further supported by means of an arm 87 which is rigidly secured by means of bolts to the adjacent supporting bracket 66 and having its free end attached to the brake band adjusting screw 88. The brake band is preferably of the contracting type and comprises the usual operating members which need not be described in detail. Referring more in detail to the brake drums 82, each of the same is provided with a central or hub portion 89, which is offset laterally from the central plane of the drum and in a direction toward the differential mechanism. The hub portion 89 of each brake drum is adapted to be inserted between the flanges 79 and 80 of each stub shaft 73 and shaft 40, respectively, and to be rigidly fixed or clamped between the flanged ends of the shafts 79 and 80 by means of the bolts 81 which extend through holes formed in said hub portions.

When assembling the structure embodying the features of the invention, and more particularly the driving gear, the differential housing with its inclosed mechanism is mounted in the brackets 66, 66, it being possible to rotate the housing about the axis of rotation of the stub shafts until the proper adjustment is obtained, as determined by the angle of inclination which the main drive shaft 72 bears to the horizontal. When this angle has been determined the key-way may be cut in the bearing sleeves 74, 74 of the housing and the key 75 inserted, thereby locking the housing in its proper angular position. The shafts 40, 40 may be assembled or mounted upon the axle independently of the differential mechanism, this being done by mounting said shafts 40, 40 in their outboard bearings 39 and then connecting the inner ends of said shafts to the stub shafts 73, 73 of the differential mechanism by means of the flange and bolt connection, the brake drums 82, 82 being mounted in position during the same operation.

By reason of this construction it is clear that the differential mechanism is a complete unit in itself and may be mounted upon the axle or removed for the purpose of repairs, without disturbing or removing the shafts 40, 40 inasmuch as this operation can be accomplished by merely disconnecting the ends of the stub shafts 73, 73 and shafts 40, 40, it being noted that the shafts 40, 40 are still supported in their proper positions and at both ends by means of the outboard bearings 39 and the brakes which may remain connected to the shafts 40, 40 and thereby maintain said shafts in their proper alinement and in the absence of the differential mechanism.

A further feature of the construction resides in the manner in which the supporting brackets for the differential housing and mechanism and for the outboard bearings 39, 39 of the shafts 40, 40 are formed. In this connection it is to be observed that all of the brackets are integral with the axle or load-supporting member and, furthermore, are all in alinement with each other. Thus the weight of the differential mechanism and shafts, in fact, the entire driving gear, is carried by the axle, and furthermore, it is possible in the finishing of the bearing brackets to bore or finish them in a single operation or set-up, thus insuring the accurate alinement of all of the brackets and it follows that the proper alinement of the differential mechanism and shaft bearings and smooth running of the parts is insured when the same are assembled.

The features embodied in our invention may obviously be modified without departing from the spirit of the invention and therefore we do not wish to be limited to the structure herein disclosed and described except in so far as it is specifically set forth in the appended claims.

We claim as our invention:

1. In a structure of the character described, the combination of a load-carrying member, wheels journaled at the ends of said load-carrying member, differential mechanism supported upon said load-carrying member comprising a differential housing and a supporting bracket mounted on said load-carrying member and comprising a split collar surrounding said housing and permitting the rotative adjustment of said housing about an axis parallel with said load-carrying member.

2. In a structure of the character described, the combination of a load-carrying member, wheels journaled at the ends of said member, driving mechanism mounted on said load-carrying member and comprising a differential housing detachably supported upon said load-carrying member, a drive shaft extending parallel to said load carrying member and comprising two parts coupled adjacent said housing, a bearing at the outer end of said drive shaft, and a separate supporting member at its end adjacent the point of coupling, thereby permitting the removal of said differential housing independently of said drive shaft.

3. In a structure of the character described, the combination of a load-carrying member, wheels journaled at the ends thereof, driving mechanism for said wheels mounted on said load-carrying member, and comprising differential mechanism and drive shafts operatively connected with said wheels, said drive shafts being parted and coupled adjacent the differential mechanism, and supported at their outer ends, and supporting members for the inner ends of said shafts located at the point of coupling.

4. In a structure of the character described, the combination of a load-carrying member, wheels journaled on the ends thereof, driving mechanism mounted on said load-carrying member and comprising a differential housing, stub shafts projecting from said housing, and drive shafts coupled to said stub shafts and in driving connection with said wheels, out-board bearings supporting the outer ends of said drive shaft, and supporting members for the inner end of said drive shafts located at the point of coupling, thereby permitting the removal of said differential mechanism independently of and without disturbing the alinement of said drive shaft.

5. In a structure of the character described, the combination of a load-carrying member, wheels journaled upon the ends thereof, a differential mechanism detachably supported upon said load-carrying member, a shaft connecting said differential mechanism with one of said wheels and consisting of two portions coupled together adjacent said differential mechanism, and means for supporting the inner end of said shaft at the point of coupling.

6. In a structure of the character described, the combination of a load-carrying member, wheels journaled at the ends thereof, a differential mechanism detachably mounted on said load-carrying member and comprising a housing and a stub shaft projecting therefrom, a drive shaft coupled with said stub shaft at its inner end and in driving connection with one of said wheels at its outer end, and co-acting brake members mounted upon said load-carrying member and drive shaft adjacent the inner end of the latter and serving to support said shaft independently of said housing.

7. In a structure of the character described, the combination of a load-carrying member, wheels journaled at the ends thereof, a differential mechanism comprising a housing and stub shafts projecting laterally from said housing, supporting brackets for detachably mounting said differential mechanism on said load-carrying member, drive shafts detachably coupled with said stub shafts and having driving connection with said wheels, and brake mechanism mounted on said load-carrying member independently of said housing and engaging said drive shafts adjacent the points of coupling with said stub shafts.

8. In a structure of the character described, the combination of a load-carrying member, a differential mechanism removably mounted on said load-carrying member, a drive shaft extending parallel with said load-carrying member, brake mechanism mounted on said load-carrying member and engaging said shaft adjacent said differential mechanism, and a coupling in said shaft intermediate said brake mechanism and said differential mechanism.

In witness whereof, we hereunto subscribe our names this 23rd day of Sept., A. D., 1919.

JAMES A. WHITCOMB.
RAYMOND KOEHLER.